Figures 1, 2:
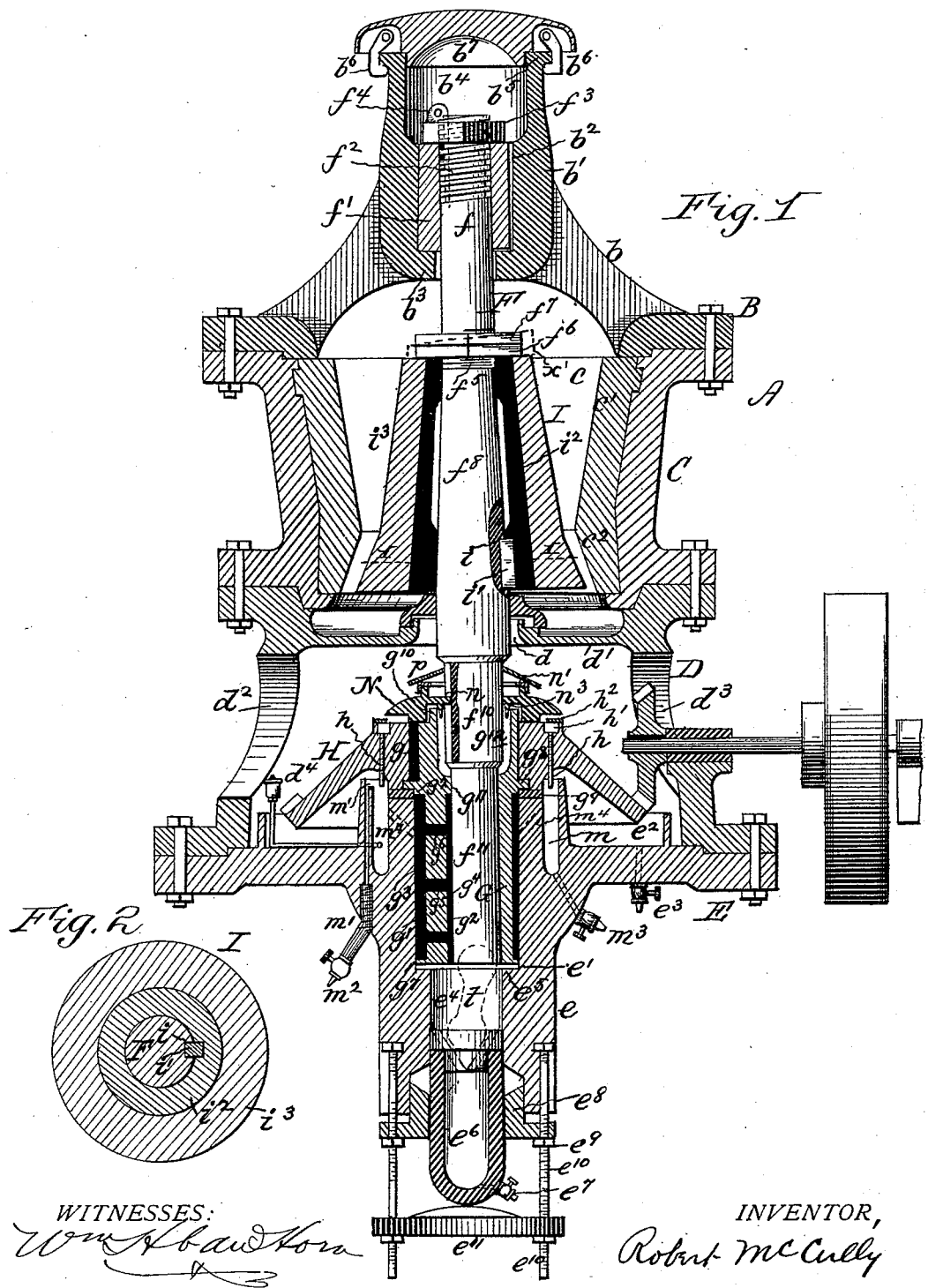

(No Model.) 3 Sheets—Sheet 1.

R. McCULLY.
CRUSHING MACHINE.

No. 463,539. Patented Nov. 17, 1891.

WITNESSES:
Wm H. Van Horn
M. H. Walker

INVENTOR,
Robert McCully
By S. J. Van Stavoren
ATTORNEY (No Model.)   3 Sheets—Sheet 2.
R. McCULLY.
CRUSHING MACHINE.
No. 463,539.   Patented Nov. 17, 1891.
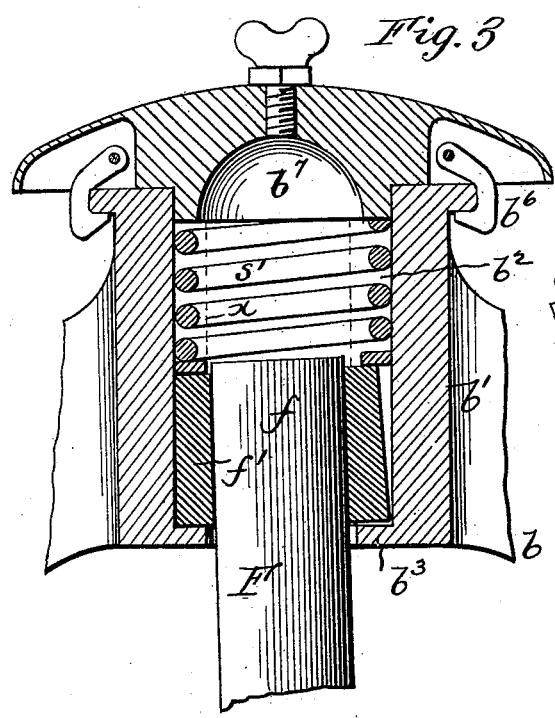
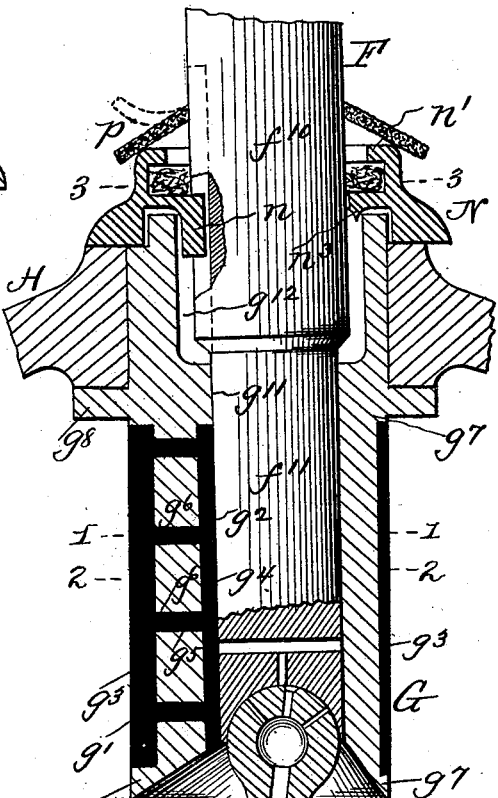

(No Model.) 3 Sheets—Sheet 3.
R. McCULLY.
CRUSHING MACHINE.
No. 463,539. Patented Nov. 17, 1891.
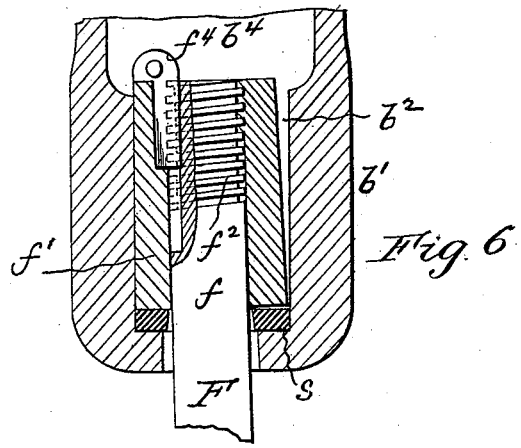
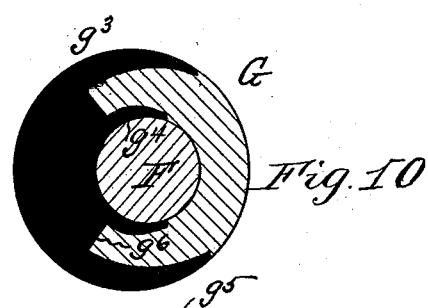
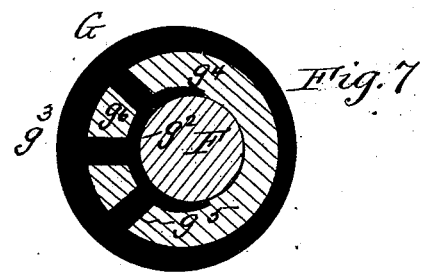
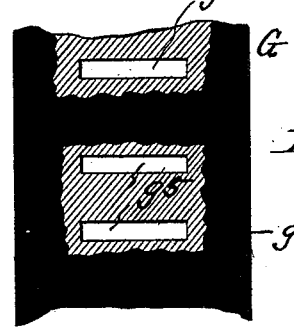
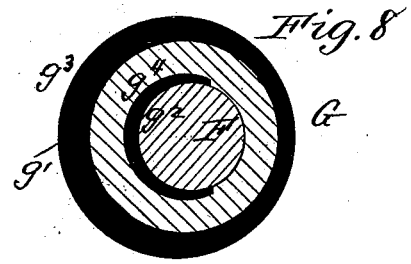
WITNESSES:
INVENTOR,
Robert McCully
By S. J. Van Stavoren
ATTORNEY

UNITED STATES PATENT OFFICE.

ROBERT McCULLY, OF PHILADELPHIA, PENNSYLVANIA.

CRUSHING-MACHINE.

SPECIFICATION forming part of Letters Patent No. 463,539, dated November 17, 1891.

Application filed November 18, 1887. Serial No. 255,468. (No model.)

*To all whom it may concern:*

Be it known that I, ROBERT MCCULLY, a citizen of the United States, residing at Philadelphia, in the county of Philadelphia and State of Pennsylvania, have invented certain new and useful Improvements in Crushing-Machines, of which the following is a specification.

My invention has relation, generally, to crushing-machines having a gyratory shaft and crusher-head, and particularly to that form of the same in which the upper end of the gyratory shaft is cylindrical and has a bearing in a tapering bore of a sleeve to admit of said end moving up and down in said tapering bore without altering the inclination of the shaft when raised or lowered to adjust the crusher-head for varying the degree of fineness of the crushing. In these machines as heretofore constructed the cylindrical upper end of the shaft has its bearings in a tapered bore of a sleeve located in the bore of a central hub in the top plate of the machine. This described construction affords only a side contact between the shaft end and the tapered bore of the sleeve, and the latter does not gyrate with the shaft. Hence there is no extended surface or fulcrum bearing for the upper end of the shaft, and all the wear is on the shaft end and its tapered bearing-sleeve.

The main object of my present invention is to provide for the sleeve gyrating with the shaft, and also an all-around contact or bearing between the bore of the sleeve and the end of the shaft to give to the latter a greater extent of surface-bearing or fulcrum and to distribute the wear to the hub bore or bearing for the sleeve, and to this end I make the bore of the sleeve cylindrical and of a size to snugly fit the correspondingly-configured upper end of the shaft, and I also so configure the outer periphery or outside of the sleeve and the bearing therefor in the machine that the sleeve assumes a position on its bearing corresponding with that of the pitch or angle of the shaft. The form of such configuration which I prefer for the outside of the sleeve is a tapering or inclined one and that of its bearing in the machine a cylindrical one; but I do not confine myself thereto, for evidently such configuration of the outside of the sleeve and of the bearing therefor in the machine may be varied or changed to admit of the sleeve assuming in the bearing the pitch-line or angle of the shaft.

My invention has for its further object simplicity of construction of parts of the machine for supporting or hanging the gyratory shaft and crusher-head from the top of the machine and for vertically adjusting said parts thereat to vary the degree of fineness of the crushing or to take up the wear of the crushing-faces without altering the angle or inclination of the shaft, whereby binding and consequent heating of the shaft in its bearings is avoided, for admitting of easily securing the crusher-head rigidly to the shaft, so that the same cannot move horizontally nor upwardly or downwardly upon the shaft, yet is easily removed from the shaft for replacement or repairs, and breaking of its chilled working face or outer shell is avoided, and for oiling the bearings of the driving eccentric and the gyratory shaft, so as to prevent splashing and waste of oil, whereby an efficient, durable, and easily-running gyratory shaft and crusher-head machine is provided.

My invention accordingly consists of the combinations, constructions, and arrangements of parts, as hereinafter described, and pointed out in the specification and claims.

Reference being had to the accompanying drawings, Figure 1 represents a vertical section, partly in elevation, showing a crushing and pulverizing machine having a gyratory shaft and crusher-head embodying my improvements; Fig. 2, a section of the crusher-head and shaft on the line 1 1, Fig. 1; Fig. 3, a vertical section drawn to an enlarged scale showing the upper part or the head of the machine and a form of bearing for the upper part of the shaft when it is supported at its lower end upon a toggle or other step-bearing; Fig. 4, a like view of the lower end of the shaft, part of the driving gear or wheel, and the driving eccentric, showing a preferable form of step-bearing for use in connection with the modification shown in Fig. 3; Fig. 5, a section on line 3 3, Fig. 4; Fig. 6, a sectional elevation of a portion of the upper part or head of the machine, showing modification of bearing and supporting and adjusting mechanism for the gyratory shaft; Fig.

7, a section through the driving-eccentric for the shaft on line 1 1, Fig. 4; Fig. 8, a like view on line 2 2, Fig. 4; Fig. 9, a sectional elevation of part of said eccentric; and Fig. 10, a section similar to Fig. 7, illustrating a modified arrangement of soft-metal bushing for the working sides of the driving-eccentric.

A represents the frame of the machine, consisting of a top plate B, having the usual or other form of spider $b$, with central hub $b'$, in the bore $b^2$ of which the upper end $f$ of the gyratory shaft F has its fulcrum or bearing, a crushing-chamber C, having suitable working faces $c$, which preferably have reverse tapers $c'$ and $c^2$, as shown, a chute or outlet-chamber D, and a bottom plate E, having a central well, bearing, or box $e$, in the bore $e'$ of which is the driving eccentric-sleeve G, keyed, as shown at $g$, to the usual driving-gear H, all of which, except as hereinafter noted, are constructed and arranged for operation in the usual or other desired manner. The upper end $f$ of shaft F is straight or cylindrical, as indicated, and passes loosely through a bearing-sleeve $f'$, located within the hub-bore $b^2$ and supported upon an inwardly-projecting annular flange $b^3$ at the bottom of said bore, in order that the angle or inclination of said shaft may not vary, but always remain constant, when the shaft is adjusted or raised and lowered for either taking up the wear of the crusher-head or altering the degree of fineness of the crushing, as fully shown and described in other pending applications filed by me on the 1st day of December, 1886, Serial Nos. 220,329 and 220,330. In said other applications the loose sleeve for the upper end of the shaft is shown provided with a tapering bore, which decreases in diameter from above downward, so that only one side of the shaft contacts with the sleeve, which therefore does not gyrate, but remains stationary, and serves only as a removable bearing or fulcrum for the upper part of the shaft, and avoids wear of the hub-bore $b^2$, and restricts the fulcrum or leverage for the upper end of the shaft. In my present application said sleeve $f'$ has a cylindrical bore and its periphery tapers from below upwardly, it having its largest diameter at its lower part, as shown. The upper part of the shaft snugly fits the bore of said sleeve and causes it to assume or coincide with the angle of the shaft, as shown in Fig. 1, to gyrate therewith. The shaft end $f$, therefore, has an all-around bearing in the gyrating sleeve $f'$, and as it is of a larger diameter than that of the shaft it presents more surface-bearing for contact with the bore of hub $b^2$ and affords an increase length of fulcrum or leverage for the upper end of the shaft than is done by the shaft itself when it gyrates within the bore of a stationary sleeve, as described and shown in said other pending applications.

Instead of supporting the shaft F upon a lower toggle or other step-bearing, as set forth in said applications, I prefer to support or hang it from the top of the machine in such a manner that the shaft may be adjusted vertically thereat, and to do this in the most simple and effective manner I cut a screw-thread $f^2$ on the upper part of the shaft end $f$, which projects above the top of sleeve $f'$ and has a nut $f^3$, as shown in Fig. 1. The thread $f^2$ is preferably a square-cut thread and is so cut that its outer diameter coincides with that of the shaft. This thread is of a length to permit full vertical adjustment of the shaft and crusher-head and yet leave sufficient length of smooth or uncut end $f$ in the bore of sleeve $f'$ when the shaft and crusher-head are adjusted downwardly to their utmost limit, as shown in Fig. 1, so as not to materially reduce the shaft-bearing in said sleeve. When the shaft and crusher-head are elevated to their full height, the screw-thread $f^2$ is then above or out of sleeve $f'$ and the shaft end $f$ then in the sleeve is an uncut or smooth surface. The nut $f^3$ impinges upon the top of sleeve $f'$ and is prevented from turning by a key $f^4$ engaging with coinciding key seats or ways in said nut and shaft end, as indicated. The key $f^4$ and the seats or ways are so formed that the key snugly fits the seat or ways, so that it may be easily withdrawn therefrom and reinserted therein. The whole weight of the shaft and crusher-head is supported by the nut $f^3$, sleeve $f'$, and the annular flange $b^3$ at the bottom of hub $b'$, so that by removing key $f^4$ and turning-nut $f^3$ the shaft and crusher-head are adjusted vertically, as desired, for taking up wear of the crusher-head or for varying the degree of fineness of the crushing, and when adjusted the key is dropped into position to maintain the adjustment. The use of the threaded upper part of the shaft and nut $f^3$, as described, avoids the employment of separate bolts for supporting and adjusting the shaft, as shown, described, and claimed in United States patents granted to me on the 7th day of September, 1886, Nos. 348,757 and 348,758.

To admit of easy access to nut $f^3$ the upper end of hub-bore $b^2$ is enlarged, as shown at $b^4$, and the hub has an outside top edge flange $b^5$ for engagement with pivoted dogs or pawls $b^6$ on cap or cover $b^7$ to firmly secure it to and close the top of the hub for preventing dirt and dust gaining access to shaft-bearings in the hub-bore.

At the lower end of the cylindrical portion $f$ of shaft F is another screw-thread, as shown at $f^5$, provided with a nut $f^6$ and jam-nut $f^7$, below which the shaft F, if desired, is made or formed into a single tapered portion $f^8$, having its largest diameter at its lower end, or at that part of the shaft which passes through the shaft-opening $d$ in the top plate $d'$ of chamber D.

Above the bottom of the tapered portion $f^8$ of shaft F, or at a proper point thereon corresponding with the base of the crusher-head I on the shaft, is a key-seat $i$, in which is rigidly fastened a key or feather $i'$, which engages with a corresponding key-seat in the bore of the crusher-head. The lower end of the key-seat in the crusher-head is open or coincides with the bottom surface of the crusher-head. The rigidly-affixed key $i'$ prevents the crusher-head moving horizontally and downwardly on shaft F, and the upward movement of the crusher-head on said shaft is limited by the nuts $f^6 f^7$, which rigidly secure the head to the shaft, as shown in Fig. 1. By loosening said nuts and running them off of the shaft, the top plate B being first removed, the crusher-head is readily removed from the shaft. The crusher-head has a bore corresponding to the section $f^8$ of shaft F, and a rotation of nuts $f^6 f^7$ in the proper direction causes them to impinge on the top of the crusher-head and prevents its upward movement on the shaft.

The crusher-head may be of any suitable construction; but I prefer to cast the inner section or cone $i^2$ of soft iron, give to it a bore corresponding with the section $f^8$ of shaft F, provide the same with end chipping pieces, as shown, and to cast upon section or cone $i^2$ the outer white or chilled iron shell or cone $i^3$, which, if desired, may have different tapered or inclined faces, as shown. The inner cone $i^2$ extends from end to end of the crusher-head, so that it has no shoulders or ledges on any part of its periphery to cause shrinking and cracking of the outer shell, either while being cast on the same or when in use, as is the case in this form of machines, in which the outer shell is cast on end bushings and at which they break off either while being made or when in use. The periphery of the soft metal or inner cone $i^2$ is smooth or unbroken from end to end, and it therefore equally supports and strengthens the outer shell or cone $i^3$ from end to end of the same to correspondingly distribute the crushing strains throughout the entire area of bearing-contact of said cones or shells to make the head durable and efficient.

The working sides $g' g^2$ of the eccentric are preferably provided with soft-metal sections or segments $g^3 g^4$, respectively, and to connect these segments transverse openings $g^5$ of any suitable outline are formed in the eccentric which fill up with said soft metal in the act of casting the segments on the eccentric to form bars $g^6$ for connecting the segments together, and thereby firmly secure them to the eccentric, thus dispensing with screws or other extraneous fastening devices. (Seen more plainly in Figs. 4, 7, 8, and 10.) To most effectively secure the segments $g^3 g^4$ to the eccentric G, however, the outer segment $g^3$ may be cast all around the eccentric-sleeve G, the inner segment $g^4$ being in all cases only part way around its bore, as shown in said figures. When the outer sleeve is cast all around the eccentric G, the segment has its greatest thickness on the working side of said sleeve. To facilitate the casting of said all-around metal segments $g^3$ on the eccentric G, it is provided with top and bottom flanges $g^7$, which are of the diameter required for the eccentric and serve as guides for holding the cylindrical mold applied thereto. Above the segments $g^3 g^4$ the eccentric G has the usual exterior annular flange $g^8$, which rests upon a steel washer $g^9$ in the top edge of well or box $e$, as also does the lower edge of the driving-wheel H, keyed to said eccentric. This steel washer $g^9$ is used to avoid wear of the top edge of well or box $e$. Surrounding the upper part of the latter is an annular gutter or channel $m$, extending above the top edge of box $e$, having on one side an overflow pipe or duct $m'$, provided with a stop-cock $m^2$. Gutter $m$ serves as an oil-chamber, and it is made deep enough to also serve as a sediment-chamber, it having a drain-cock $m^3$. The oil in chamber or gutter $m$ finds its way to the bearing for the eccentric G by way of inclined transverse openings $m^4$, provided in the walls of box $e$, as shown by dotted lines, Fig. 1.

Into the chamber or gutter $m$ leads one or more ducts or pipes $h$, depending from an annular gutter or channel $h'$ in the top of wheel H, which gutter is partly closed by an inwardly-projecting annular flange $h^2$ to prevent splashing of oil from said gutter, and also to form a dripway to it for any oil escaping from an oil-chamber N, separate from but supported upon the top of wheel H, for a purpose hereinafter described. The eccentric G preferably projects above the top of wheel H, and the outer periphery of said projection is made concentric with the bore of the eccentric, as shown at $g^{10}$, to prevent dirt or cuttings getting into the eccentric bore $g^{11}$ and its bearings. The top of eccentric bore $g^{11}$ is enlarged, as shown at $g^{12}$, so that the shaft F has no bearing in the top of said sleeve or in that part of the same passing through or connected to wheel H, except at the bottom of the same. Hence all torsional straining of the wheel H upon its bearings is avoided, which is not the case in these machines as heretofore constructed.

The separate oil-chamber N has a key connection $n$ with a seat or way in shaft F to cause chamber N to gyrate with said shaft. Oil-chamber N is provided at its top edge with an inwardly-projecting flange $n'$, which may be integral with or separate therefrom, (see Figs. 1 and 4,) to prevent splashing of oil from said chamber. The latter may have ducts or channels $n^2$, (see more plainly Fig. 5,) which communicate with the enlarged upper part $g^{12}$ of eccentric bore $g^{11}$ for oiling it and the shaft G.

To prevent the oil feeding from chamber N dripping onto the top of wheel H as it passes out of the ducts $n^2$, an annular flange $n^3$, depending into the enlarged upper part of the bore of eccentric G, is formed on the under side of the oil-chamber N and is located between the shaft F and eccentric G. The oil-chamber N is covered by a disk of textile or other suitably stiff or flexible material $p$, so that it can at any time be lifted on one side to admit of supplying oil to the oil-chamber N. The flexible covering $p$ prevents dust or dirt gaining access to well, and the oil-chamber N performs the same function for the bore of the eccentric G. As the oil-chamber N has a key connection $n$ with the shaft F, said chamber gyrates with the shaft and does not revolve with driving-wheel H, as in other machines, and as the key connection $n$ is a sliding one it permits the shaft F to be raised or lowered without affecting the position of the oil-chamber N. The portion $f^{10}$ of shaft F that passes through the oil-chamber N and down into the top of the eccentric bore or its enlargement $g^{12}$ is of a larger diameter than that portion $f^{11}$, which has its bearing in the eccentric bore $g^{11}$, in order to admit of cutting in part $f^{10}$ of shaft F a seat or slot having an open bottom for oil-chamber key $n$ to either pass into and out of as the shaft F is either respectively lowered into or raised out of the machine.

If desired, waste or like material may be inserted in the oil-chamber N to prevent too rapid flow of oil from chamber N.

One side of chute-chamber D is provided with a suitable opening $d^2$, preferably opposite to the counter-shaft opening $d^3$ therein, and as shown in Fig. 1, for admitting of supplying oil to chamber N when desirable to do so. The cup or supply $d^4$ for the oil gutter or chamber $m$ may, therefore, be located within said chute-chamber, as shown in Fig. 1, instead of exterior thereto, as heretofore done. The overflow of oil from chamber or gutter $m$ escapes through pipe $m'$, the cock $m^2$ of which is preferably always open to the outside of the machine.

The bottom plate E has upon its upper side the usual drip-well $e^2$ for oil from the wheel H, and is provided with a suitable drain-cock $e^3$.

To prevent the shaft F, when supported from the top of the machine falling down in the well of box $e$ when its supporting-nut $f^3$ is removed from it, the bore $e'$ in well or box $e$ is contracted at $e^4$ to form an annular shoulder $e^5$ just below the bottom of the shaft F at a plane corresponding to its lowest downward adjustment for the shaft to rest upon when its supporting-nut $f^3$ is removed.

The bottom of well or box $e$ may be closed in any suitable manner; but I prefer to provide it with a removable sediment-chamber $e^6$, having, if desired, a drip or drain cock $e^7$ and a stuffing-box $e^8$, adjusted by nuts $e^9$ on screw-rods $e^{10}$, which support the base-plate $e^{11}$ for sediment-chamber $e^6$ within the well or box $e$, as shown in Fig. 1, so that toggle or knuckle step-bearing $t$ may be employed, if desired, to support shaft F in addition to its supporting-nut $f^3$ at the top of the machine, said toggle being indicated by dotted lines in Fig. 1, in full lines in Fig. 4, and is arranged for operation, as described and claimed in another pending application filed by me on the 17th day of September, 1886, Serial No. 213,795.

A crushing-mill constructed as above described has its shaft supported at its upper end and is vertically adjusted thereat, and when adjusted its angle of inclination is not altered, all binding of the shaft in its upper and lower bearings is avoided, as are also torsional strains on the driving-wheel. Hence the shaft runs easier and an economy of power for driving it is effected. Furthermore, the bearings of the shaft in the eccentric are supplied with oil from the top of the driving-wheel and from a gutter or annular chamber provided with an overflow-pipe and located below said wheel to materially prevent splashing of oil in and overflow from said parts.

Instead of the shaft F loosely passing through and having a bearing in sleeve $f'$, and instead of employing the nut $f^3$ for supporting and adjusting said shaft, the upper threaded part $f^2$ of the shaft may engage directly with a threaded part in the bore of sleeve $f'$ at its top, said engagement being maintained by a key $f^4$. (See Fig. 6.) In this case the sleeve $f'$ is firmly connected to the shaft and gyrates with it, as before, and serves both as a nut and sleeve, and in adjusting the shaft the key $f^4$ is removed before the adjustment is made, and when completed is reinserted in position, as above described. If desired, a steel washer $s$ may be inserted between the lower edge of sleeve $f'$ and the flange $b^3$ to avoid wear of the latter. (See Fig. 6.) If the shaft is wholly supported at its bottom, as indicated in Fig. 4, the upper part of the shaft is smooth or unthreaded, as shown in Fig. 3, and the sleeve $f'$ is prevented from rising in the bore of hub $b'$ by a spring $s'$, as shown in full lines of Fig. 3, or by a second sleeve resting upon sleeve $f'$, as indicated by dotted lines $x$ in said figure, in which case the bore of the hub may be of an equal diameter throughout above the bottom flange $b^3$. By supporting the shaft F and crusher-head from the top of the machine and having means for adjusting it without altering its inclination the lower different tapering surfaces of the crushing-chamber and crusher-head can be brought closer together for fine grinding without producing friction in the shaft-bearings than is possible to do in this class of machines as heretofore made.

I do not limit myself to the detail construction of the novel parts of my invention, as it is obvious that the same may be greatly modified without departing from the spirit of my improvements. Thus, for instance, a wedge or pin driven through a transverse opening in the shaft may be substituted for the nuts $f^6 f^7$, and screw-thread $f^5$ for rigidly affixing the crusher-head to the shaft, as indicated in dotted lines $x'$ in Fig. 1.

I do not herein claim, broadly, the bottom plate E, having well $e$ and oil-chamber $m$ outside of and extending above well $e$, combined with an oil-supply and also with the driving-wheel eccentric hub in the well, as the same form part of the subject-matter of another pending application filed by me September 17, 1886, Serial No. 213,795.

While I prefer the forms of connection shown and described between the shaft and sleeve $f'$ I do not limit myself thereto, for it is evident that such forms may be varied or changed without departing from the spirit of the invention.

What I claim is—

1. In a crushing-machine, the combination of top plate B, having central hub-bore $b^2$, with bottom flange $b^3$, sleeve $f$, having a cylindrical bore and an outside taper resting on flange $b^3$, and gyratory shaft F, having upper cylindrical end fitting the bore of said sleeve, substantially as set forth.

2. In a crushing-machine, the combination of top plate B, having central hub-bore $b^2$, with enlarged upper end $b^4$ and bottom flange $b^3$, the gyratory shaft F, having upper cylindrical end $f$, screw-threaded at $f^2$ and provided with nut $f^3$, a key and key-seat in said nut and shaft end, and sleeve $f'$, having a cylindrical bore and a tapered periphery, substantially as set forth.

3. The combination of crushing-machine top frame-plate B, having central hub-bore $b^2$ and bottom flange $b^3$, the gyratory shaft F, having upper cylindrical end $f$, screw-threaded at $f^2$ and provided with nut $f^3$, and a sleeve having a cylindrical bore and a tapered periphery, substantially as set forth.

4. In a crushing-machine, the combination of top frame-plate B, having central hub-bore $b^2$, with upper enlarged end $b^4$ and bottom flange $b^3$, the gyratory shaft F, having upper cylindrical end $f$, screw-threaded at $f^2$ and having nut $f^3$, a sleeve $f'$, having a cylindrical bore, and a tapered periphery resting upon flange $b^3$ and gyrating with said shaft, substantially as set forth.

5. In a crushing-machine, the top frame-plate B, having a top flange $b^5$, and a cover $b^7$, having pivoted gravity pawls or dogs $b^6$ for engagement with said flange, substantially as set forth.

6. In a crushing-machine, the combination of a gyratory shaft having a tapered portion $f^8$, a vertically-located rigid key $i'$ on shaft F at the bottom of said tapered portion, a crusher-head having a tapered bore corresponding to the shaft taper $f^8$, and a vertical recess with a lower open end for passing onto and engaging with said key $i$, and a screw-nut on said shaft at the top of its taper $f^8$ for engagement with the top of the crusher-head, substantially as set forth.

7. The combination of a gyratory shaft F, having taper portion $f^8$, a vertically-located key $i'$ at the lower end of said taper, crusher-head I, having a tapering bore corresponding to taper $f^8$ and a keyway in said bore with lower open end for engagement with said key $i'$, and devices on said shaft at the top of the crusher-head for rigidly maintaining the crusher-head in position so that it cannot move upwardly or downwardly on the shaft, substantially as set forth.

8. In combination with a gyratory shaft, a detachable crusher-head having at its bottom and in its bore a vertical recess with lower open end, a correspondingly-located key on said shaft for engagement with said crusher-head, recess for preventing horizontal and downward movement of the crusher-head, and devices on the shaft at the top of the crusher-head for preventing upward movement of the crusher-head on the shaft, substantially as set forth.

9. In combination with a gyratory shaft, the detachable crusher-head I, composed of a soft-iron inner cone or shell $i^2$, extending from end to end of the crusher-head, an outer chilled or hard-metal cone $i^3$, a vertically-located key between said shaft and the crusher-head at the bottom of the latter, and fastening devices on the shaft at the top of the crusher-head, substantially as set forth.

10. In a crushing-machine, the combination of gyratory shaft F, bottom frame-plate E, having well $e$, an annular oil and sediment chamber surrounding the top of said well and having an overflow-pipe leading from the top of said annular oil-chamber to the outside of plate E and having a stop-cock at its exterior end and an oil-supply for said annular oil-chamber, substantially as set forth.

11. In a crushing-machine, the combination of a gyratory shaft F, a bottom frame-plate E, having well $e$, provided with a bore $e'$ and a contracted bore $e^4$ to form a shoulder or ledge $e^5$ therein, and a plug provided with a tubular sediment-chamber in said contracted bore $e^4$, substantially as set forth.

12. The combination, in a gyratory crushing-machine, of the bottom plate well $e$, having upper bore $e'$ and a lower contracted bore $e^4$ below said bore $e'$, a driving-eccentric for a gyratory shaft in bore $e'$, and a removable sediment-chamber in bore $e^4$, substantially as set forth.

13. The combination of a gyratory shaft F, the bottom frame-plate E, having well $e$, driving-eccentric G, having a bore or bearing for said shaft and said bore being enlarged at its upper end to form a chamber between the shaft and eccentric, and oiling devices for said chamber, substantially as set forth.

14. The combination of a gyratory shaft F, the driving-eccentric G, having at its upper end a chamber or enlarged bore $g^{12}$, and oiling devices for said chamber or bore, substantially as set forth.

15. The combination of a gyratory shaft F, the driving-eccentric G, having enlarged bore $g^{12}$ and wheel H, and said bore $g^{12}$ having a curb or wall projecting above the top of the wheel H, and oiling devices for said bore, substantially as set forth.

16. The combination of gyratory shaft F, the driving-eccentric G, having bore $g^{12}$, wheel H, and enlarged bore $g^{12}$, having a curb or wall projecting above said wheel, and a plate N, resting upon but separate from said wheel and having an oil-chamber communicating with bore $g^{12}$, substantially as set forth.

17. The combination of shaft F, the driving-eccentric G, wheel H, and a plate N, having an oil-chamber and said plate engaging with said shaft and the latter being vertically adjustable through said oil-chamber, substantially as set forth.

18. The combination of the shaft F, wheel H, the plate N, having an oil-chamber, an inwardly-projecting top flange $n'$, bottom flange $n^3$, and driving-eccentric G, having top chamber or enlarged bore $g^{12}$, substantially as set forth.

19. The combination of gyratory shaft F, the driving-eccentric G, wheel H, having at its top an annular gutter $h'$, the bottom frame-plate E, having well or box $e$ and oil-chamber $m$ and outlet or drip tubes from wheel-gutter $h'$ depending into gutter $m$ on frame E, and an oil-supply, substantially as set forth.

20. The combination of gyratory shaft F, the driving-eccentric G, having upper chamber $g^{12}$, wheel H, and a plate N, having an oil-chamber and a cover $p$, substantially as set forth.

21. The combination of gyratory shaft F, the driving-eccentric G, having chamber $g^{12}$, wheel H, and a plate N, having an oil-chamber and flexible or lifting cover $p$, substantially as set forth.

22. The combination of gyratory shaft F, having an open-ended slot, wheel H, the plate N, having an oil-chamber, a cover $p$, and having key $n$ engaging with said slot, and driving-eccentric G, substantially as set forth.

23. In a crushing-machine, the combination of a vertically-adjustable gyratory shaft, the driving-eccentric G, having on its working faces soft-metal segments $g^3$ $g^4$, united by transverse integral bars $g^6$ in corresponding openings in said eccentric, substantially as set forth.

24. In a crushing-machine, the combination of a vertically-adjustable gyratory shaft, the driving-eccentric G, having upper and lower flanges $g^7$, exterior circular shell of soft metal $g^5$, inner segment $g^4$, and integral transverse bars $g^6$, connecting said segment and shell, substantially as set forth.

25. In a crushing-machine, the combination of a plate B, having central hub-bore $b^2$ with inwardly-projecting bottom flange $b^3$, gyratory shaft F, having upper cylindrical end, sleeve $f'$, having a cylindrical bore fitting said shaft end and supported on flange $b^3$, and a screw-thread connection between said sleeve and shaft, substantially as set forth.

26. In a crushing-machine, the combination of a plate B, having a hub-bore $b^2$ with inwardly-projecting flange $b^3$, a gyratory shaft F, having a cylindrical end, a sleeve $f'$, having a cylindrical bore fitting said shaft end and supported on flange $b^3$, a screw-thread on said shaft end, and a nut on said screw-threaded part of said shaft end engaging with said sleeve for holding and adjusting the shaft in position, substantially as set forth.

27. In a crushing-machine, the combination of a plate B, having a hub-bore $b^2$ with inwardly-projecting flange $b^3$, a gyratory shaft F, having a cylindrical end, a sleeve $f'$, having a cylindrical bore fitting said shaft end and supported on said flange, and adjusting mechanism between the sleeve and shaft for vertically adjusting the shaft, substantially as set forth.

28. The combination of a bearing-plate B, having a bore $b^2$ with inwardly-projecting flange $b^3$, a gyratory shaft having a cylindrical end, a sleeve $f'$, having a cylindrical bore fitting said shaft end and supported on said flange, and the outside periphery of the sleeve, the bearing-surfaces of bore $b^2$ and of its inwardly-projecting flange for said sleeve being configured to admit of the sleeve assuming the pitch-line or angle of said shaft, substantially as set forth.

In testimony whereof I affix my signature in presence of two witnesses.

ROBERT McCULLY.

Witnesses:
CHAS. F. VAN HORN,
S. J. VAN STAVOREN.